United States Patent
Dahal et al.

(10) Patent No.: US 11,902,467 B1
(45) Date of Patent: Feb. 13, 2024

(54) SYSTEM AND METHOD OF DIRECTED FLOW INTERACTIVE CHAT

(71) Applicant: West Corporation, Omaha, NE (US)

(72) Inventors: Prabhat Dahal, Omaha, NE (US); Geoff Finch, Omaha, NE (US); Steven Heithoff, Elkhorn, NE (US); Mike Lindner, Omaha, NE (US); Sarath Ravindran, Omaha, NE (US); Mayank Sawala, Omaha, NE (US)

(73) Assignee: INTRADO CORPORATION, Omaha, NE (US)

(*) Notice: Subject to any disclaimer, the term of this patent is extended or adjusted under 35 U.S.C. 154(b) by 0 days.

(21) Appl. No.: 16/185,839

(22) Filed: Nov. 9, 2018

(51) Int. Cl.
*H04M 3/51* (2006.01)
*H04M 3/523* (2006.01)

(52) U.S. Cl.
CPC ....... *H04M 3/5166* (2013.01); *H04M 3/5235* (2013.01)

(58) Field of Classification Search
CPC .......................... H04M 3/5166; H04M 3/5235
See application file for complete search history.

(56) References Cited

U.S. PATENT DOCUMENTS

| 10,009,467 | B1* | 6/2018 | Valiente | G06Q 30/04 |
| 2004/0162724 | A1* | 8/2004 | Hill | G10L 15/1822 704/231 |
| 2006/0133587 | A1* | 6/2006 | Bushey | H04M 3/5166 379/88.14 |
| 2014/0122407 | A1* | 5/2014 | Duan | G06N 5/02 706/50 |
| 2014/0334614 | A1* | 11/2014 | Mezhibovsky | H04M 3/4936 379/88.01 |
| 2017/0017694 | A1* | 1/2017 | Roytman | G06F 16/9535 |
| 2017/0116177 | A1* | 4/2017 | Walia | G06F 40/35 |
| 2017/0206797 | A1* | 7/2017 | Solomon | G06N 3/006 |
| 2017/0374198 | A1* | 12/2017 | de Silva | H04M 7/0078 |
| 2018/0096686 | A1* | 4/2018 | Borsutsky | G10L 15/22 |

* cited by examiner

*Primary Examiner* — Ahmad F. Matar
*Assistant Examiner* — Jirapon Tulop

(57) ABSTRACT

A method is provided. The method comprises a computer performing receiving notice of an incoming inquiry originated by a customer device. The method further comprises the computer performing instantiating a session with the customer device, the session performing comprising the computer combining chatbot functionality and flow control functionality. The method further comprises the computer performing a prompt to the customer device, the prompt comprising a set of valid selections. The method further comprises the computer performing receiving a selection from the customer device. The method further comprises the computer, performing based on the received selection, at least one of providing information to the customer device and routing the inquiry.

17 Claims, 3 Drawing Sheets

SYSTEM AND METHOD OF DIRECTED FLOW INTERACTIVE CHAT

CROSS REFERENCE TO RELATED APPLICATIONS

None.

FIELD OF THE DISCLOSURE

The present disclosure relates generally to call center management and their provision of support services to customers. More particularly, the present disclosure provides systems and methods of combing chatbot functionality with flow control functionality to relieve call centers of costs and management burden associated with agent-controlled chatbot and chatbot controlled by artificial intelligence applications.

BACKGROUND OF THE DISCLOSURE

Organizations operating call centers seek to manage their costs while providing good service to callers. Staffing a call center with qualified human agents, especially on a round-the-clock basis is costly and burdensome on management. Continually hiring and training agents and maintaining interactive voice response systems (IVR) impose further costs. Call centers thus seek to manage such costs while maintaining customer satisfaction and loyalty.

Some previous implementations for handling customer voice calls and data inquiries have used chatbot applications that are controlled by human agents. Such implementations give customers an illusion of dealing with automation when in fact they are dealing with humans. Call centers using such implementations must bear the costs of staffing human agents to control the chatbots. Call centers must also continually maintain and upgrade their IVR and call-switching systems.

Other implementations using chatbot control the process with artificial intelligence (AI). The approach provides for AI modules to interrupt the chatbot operations based on some user interaction. Solutions involving AI are expensive due to the high cost of developing AI software. Such software have to be customized for the specific needs of customers and customized for the chatbot software with which the AI software will need to blend with seamlessly.

SUMMARY OF THE DISCLOSURE

In an embodiment, a method is provided. The method comprises a computer performing receiving notice of an incoming inquiry originated by a customer device. The method further comprises the computer performing instantiating a session with the customer device, the session comprising the computer combining chatbot functionality and flow control functionality. The method further comprises the computer performing communicating a prompt to the customer device, the prompt comprising a set of valid selections. The method further comprises the computer performing receiving a selection from the customer device. The method further comprises the computer performing, based on the received selection, at least one of providing information to the customer device and routing the inquiry.

In an embodiment, a system is provided. The system comprises a processor, a memory, and an application stored in the memory than when executed on the processor, receives notice of an incoming inquiry originated by a customer device. The system also instantiates a session with the customer device in which the system combines chatbot functionality and flow control functionality. The system also communicates a prompt to the customer device, the prompt comprising a set of valid selections. The system also receives a selection from the customer device. The system also, based on the received selection, at least one of provides information to the customer device and routes the inquiry.

In an embodiment, a non-transitory computer readable storage medium is provided. The medium is configured to store instructions that when executed cause a processor to perform receiving notice of an incoming inquiry originated by a customer device. The medium is further configured to store instructions that when executed cause a processor to perform instantiating a session with the customer device, the session comprising the computer combining chatbot functionality and flow control functionality. The medium is further configured to store instructions that when executed cause a processor to perform communicating a prompt to the customer device, the prompt comprising a set of valid selections. The medium is further configured to store instructions that when executed cause a processor to perform receiving a selection from the customer device. The medium is further configured to store instructions that when executed cause a processor to perform, based on the received selection, at least one of providing information to the customer device and routing the inquiry.

DETAILED DESCRIPTION OF THE INVENTION

Systems and methods described herein provide for combining chat session and chatbot functionality with flow control system functionality. Such a combination may supplement or replace previously implemented systems that combined purely human agents with chatbots or those that combined artificial intelligence with chatbots.

By using directed flow control and programmed flow, systems and methods may effectively provide a new channel and a middle ground between agent-controlled chat and chat controlled by artificial intelligence. A flowchart that is similar to interactive voice response or SMS (text-based) communication may be adapted to a medium of chatbot supported by flow control systems. A directed flow control chatbot is hence provided herein.

Question and answer sessions may be developed for the new medium of combined chatbot and flow control technologies. Interaction is controlled almost entirely by inputs and controls. Such chatbot and flow control together would allow customers to be better self-served through predefined questions and answers, thus potentially reducing the need to transfer customers to live agents.

Figure 1:
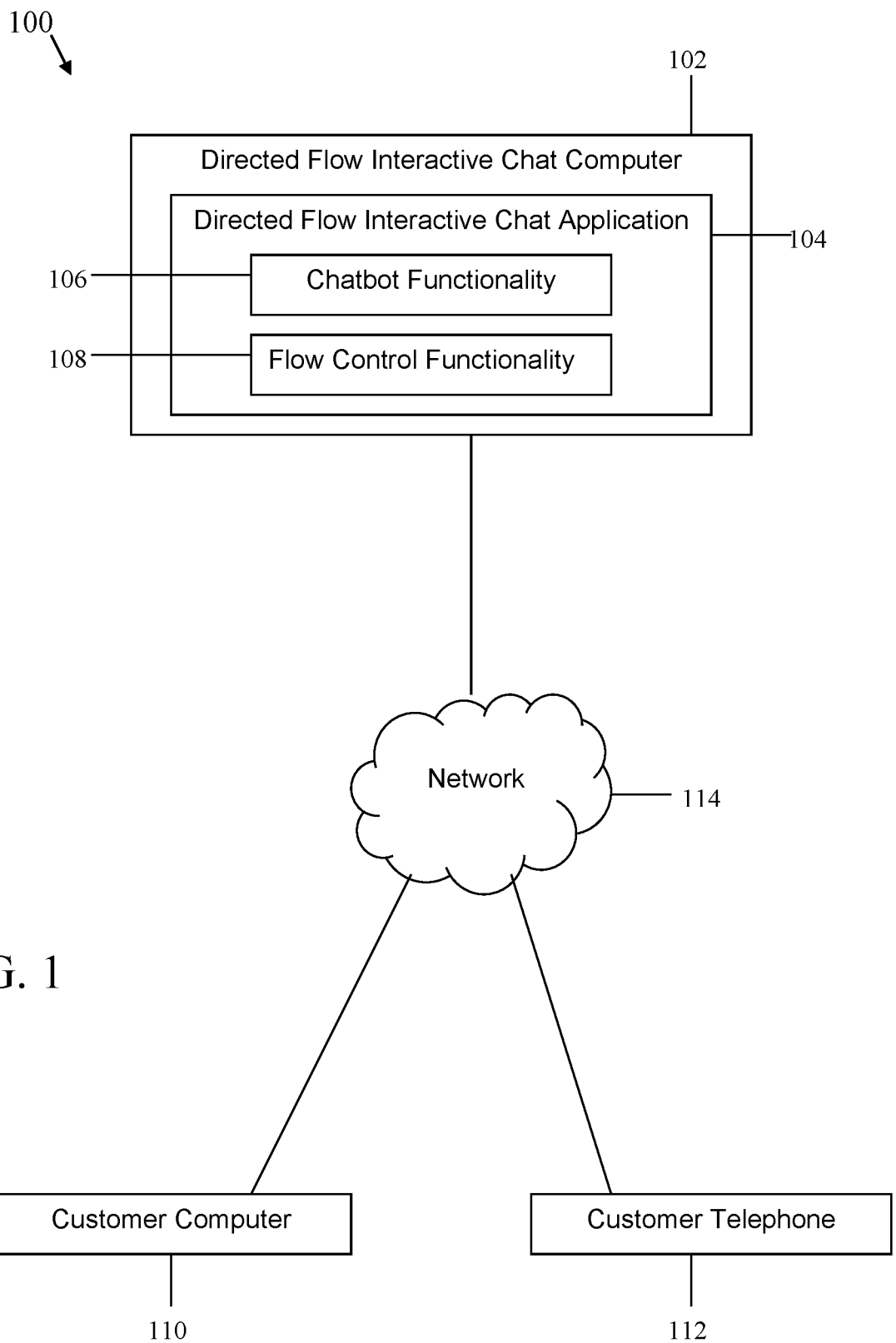
FIG. 1 is a block diagram of a system for directed flow interactive chat in accordance with an embodiment of the present disclosure.

Turning to the figures, FIG. 1 is a block diagram of a system of directed flow interactive chat according to an embodiment of the present disclosure. FIG. 1 depicts components and interactions of a system 100.

System 100 comprises a directed flow interactive chat computer 102 and a directed flow interactive chat application 104. For brevity purposes these components may be referred to as the computer 102 and the application 104, respectively. System 100 also comprises chatbot functionality 106, flow control functionality 108, a customer computer 110, and a customer telephone 112.

The computer 102 may be a general purpose computer. General purpose computers are described in detail hereinafter. The computer 102 may in embodiments comprise two or more physical computers. The two or more physical computers may be situated in more than one geographical location.

The application 104 executes on the computer 102 and provides the services described herein. The application 104 may comprise a plurality of software components including application programming interfaces (API) and may execute on more than one physical computer.

The chatbot functionality 106 and the flow control functionality 108 are depicted in FIG. 1 as separate components for discussion purposes. The application 104 comprises both the chatbot functionality 106 and the flow control functionality 108 working together as well as with other components (not shown) that execute on the computer 102 or elsewhere. The application 104 relies upon the chatbot functionality 106 and the flow control functionality 108 to work together in a manner that is blended and commingled. A knowledgeable person may be unable to distinguish between these two components as they work together to enable the application 102 to provide the services described herein.

Chatbot functionality 106 is provided by computer software that conducts a conversation via auditory and textual methods. Chatbot software is designed to convincingly simulate how a human would behave as a conversational partner. Chatbot functionality 106 may use natural language processing systems or may simply scan customer keywords and search databases for likely replies.

The customer computer 110 and the customer telephone 112 are devices that a customer may use to contact the computer 102 using data or voice means, respectively. Using the customer computer 110, a customer activating a web browser may contact a support center via the Internet and engage in a combined chatbot and flow control session with the application 104. Using the customer telephone 112, a customer may initiate a voice call to a support center, be connected to the computer 102 and be engaged in a voice, keypad, or other interaction with the application 104.

The customer computer 110 and the customer telephone 112 are provided herein and described simplistically for discussion purposes. In practice, each of the customer computer 110 and the customer telephone 112 may perform functions of the other. A customer may use a wireless device to contact a support center. The wireless device may provide a significant amount of functionality of both the customer computer 110 and the customer telephone 112. Each of the customer computer 110 and the customer telephone 112 may be referred to as the customer device.

The application 104 may provide a directed dialogue prompt that communicates a valid set of responses to the customer. It may ask, "How may I help you? Please say something like account balance, order status, or more options." The application 104 seeks to induce a response from the customer that exactly or closely matches a choice provided by the prompting of the application 104.

The network 114 promotes communication between the components of the system 100. The network 114 may be any communication network including a public data network (PDN), a public switched telephone network (PSTN), a private network, and/or a combination thereof.

Figure 2:
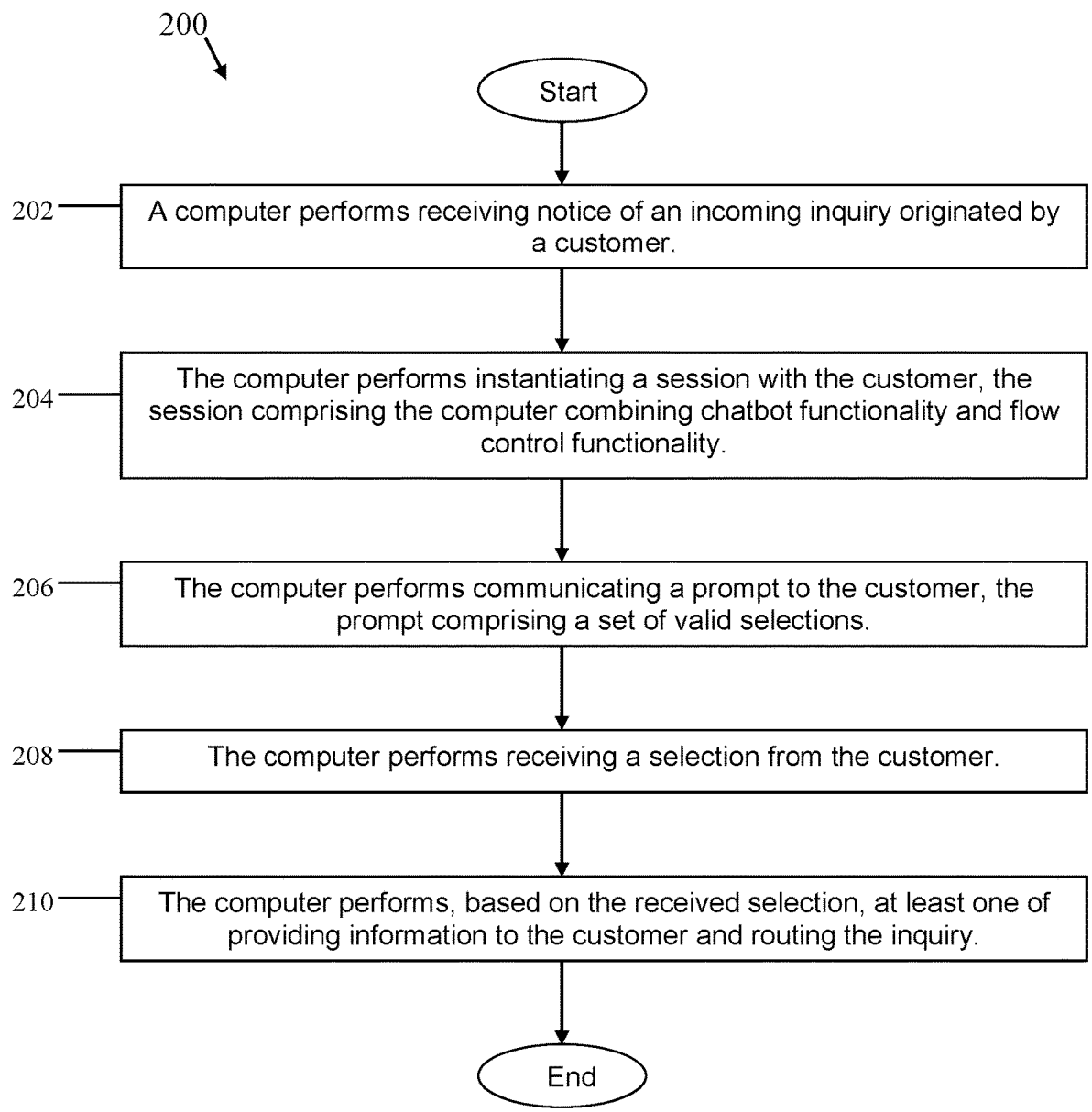
FIG. 2 is a flowchart of a method of directed flow interactive chat in accordance with an embodiment of the present disclosure.

FIG. 2 is a flowchart of a method of directed flow interactive chat according to an embodiment of the present disclosure. FIG. 2 depicts steps of a method 200.

The method 200 begins at block 202. At block 202, a computer performs receiving notice of an incoming inquiry originated by a customer. At block 204, the computer performs instantiating a session with the customer, the session comprising the computer combining chatbot functionality and flow control functionality. At block 206, the computer performs communicating a prompt to the customer, the prompt comprising a set of valid selections. At block 208, the computer performs receiving a selection from the customer. At block 210, the computer, performs based on the received selection, at least one of providing information to the customer and routing the inquiry. The method 200 thereafter ends.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 3:
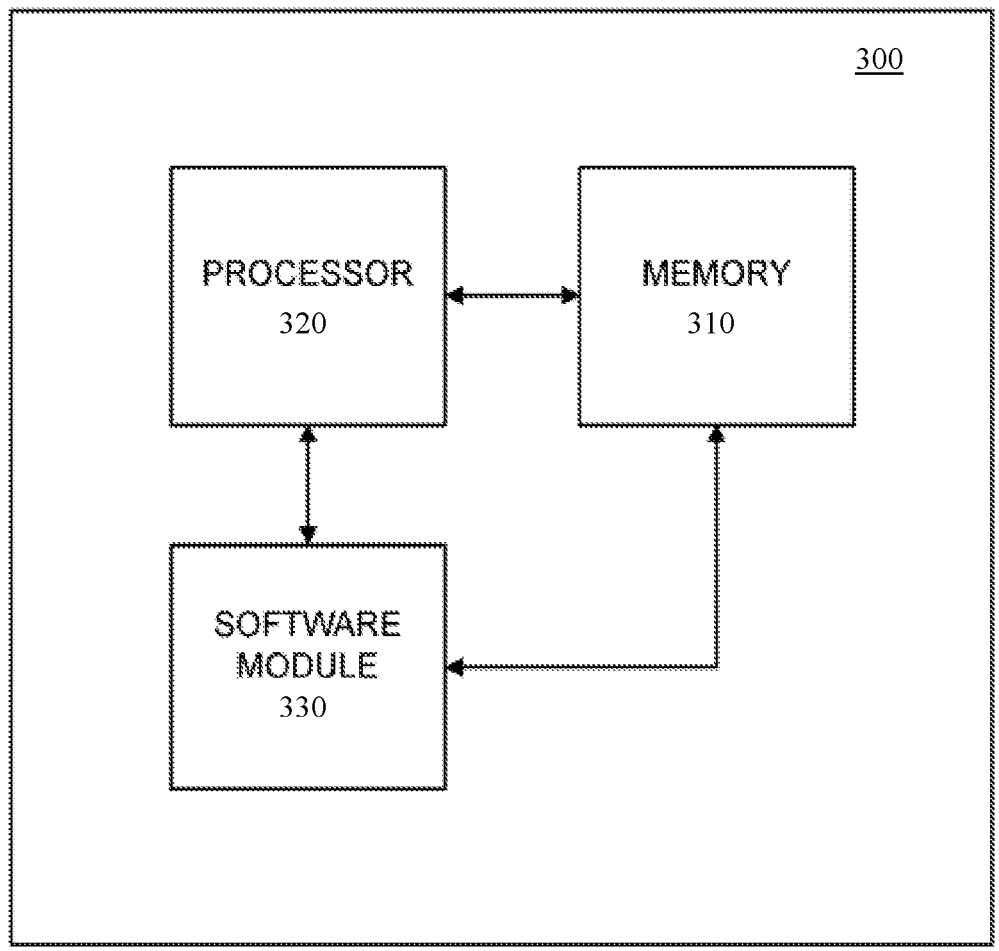
FIG. 3 is a block diagram of a system for directed flow interactive chat in accordance with an embodiment of the present disclosure.

FIG. 3 is a block diagram of a system for directed flow interactive chat in accordance with an embodiment of the present disclosure. As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. Furthermore, a software module 330 may be another discrete entity that is part of the network entity 300, and which contains software instructions that may be executed by the processor 320.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. A method comprising:
   instantiating, via a computer, a session with a customer device;
   conducting, during the session, chatbot functionality which comprises providing auditory and textual exchanges via a conversation between the customer device and the computer via auditory and textual simulation;
   identifying a response sought from a user of the customer device;
   generating a vocal prompt which seeks to induce the response sought from the user and playing the vocal prompt via the conversation, wherein, when played, the vocal prompt comprises a description of a set of exemplary selections and a request for a response similar to the set of exemplary selections;
   receiving, via the computer, a voice response from the customer device;
   matching, via the computer, the voice response to a corresponding selection from the set of exemplary selections, wherein the selection comprises an inquiry; and
   deciding, via the computer, whether to route a flow of chat from the customer device to a human-controlled chatbot or to an automated artificial intelligence (AI) chatbot during the session based on the selection and routing the inquiry based on the deciding.

2. The method of claim 1, wherein the session is not controlled by a human agent.

3. The method of claim 1, wherein the session is not controlled by artificial intelligence means.

4. The method of claim 1, wherein the vocal prompt comprises predefined questions for the user of the customer device.

5. The method of claim 1, further comprising:
   controlling the session by at least one of flow and processing of inputs.

6. The method of claim 5, wherein the inputs are at least one of voice and keypad entry provided by the customer device.

7. The method of claim 1, further comprising:
   routing the inquiry to the human-controlled chatbot based on at least one of a customer device input and a determination of customer need.

8. The method of claim 1, further comprising:
   the computer using application programming interfaces (API) to address the inquiry.

9. A system comprising:

a computer and a processor; and a memory storing an application that executed by the processor causes the processor to:

instantiate a session between the computer a customer device;

conduct, during the session, chatbot functionality which comprises providing auditory and textual exchanges via a conversation between the customer device and the computer via auditory and textual simulation;

identify a response sought from a user of the customer device;

generate a vocal prompt which seeks to induce the response sought from the user and play the vocal prompt via the conversation, wherein, when played, the vocal prompt comprises a description of a set of exemplary selections and a request for a response similar to the set of exemplary selections;

receive a voice response from the customer device;

match the voice response to a corresponding selection from the set of exemplary selections, wherein the selection comprises an inquiry; and decide whether to route a flow of data from the customer device to a human-controlled chatbot or to an automated artificial intelligence (AI) chatbot during the session based on the selection and route the inquiry based on the deciding.

10. The system of claim 9, wherein the vocal prompt vocal prompt comprises predefined questions for a user of the customer device.

11. The system of claim 9, wherein the processor further controls the session by at least one of processing flow and processing of inputs.

12. The system of claim 11, wherein the inputs are at least one of voice and keypad entry provided by the customer device.

13. The system of claim 9, wherein the processor routes the inquiry to the human-controlled chatbot based on at least one of a customer device input and a determination of customer need.

14. A non-transitory computer readable storage medium configured to store one or more instructions that when executed by a processor cause the processor to perform:

instantiating a session between a computer and a customer device;

conducting, during the session, chatbot functionality which comprises providing auditory and textual exchanges via a conversation between the customer device and the computer via auditory and textual simulation;

identifying a response sought from a user of the customer device;

generating a vocal prompt which seeks to induce the response sought from the user and playing the vocal prompt via the conversation, wherein, when played, the vocal prompt comprises a description of a set of exemplary selections and a request for a response similar to the list of exemplary selections;

receiving a voice response from the customer device;

matching the voice response to a corresponding selection from the set of exemplary selections, wherein the selection comprises an inquiry; and deciding whether to route a flow of data from the customer device to a human-controlled chatbot or to an automated artificial intelligence (AI) chatbot during the session based on the deciding.

15. The non-transitory computer readable storage medium of claim 14, wherein the vocal prompt comprises predefined questions for a user of the customer device.

16. The non-transitory computer readable storage medium of claim 14, wherein the session is controlled by at least one of processing flow and processing of inputs.

17. The non-transitory computer readable storage medium of claim 16, wherein the inputs are at least one of voice and keypad entry provided by the customer device.

\* \* \* \* \*